(No Model.)
2 Sheets—Sheet 1.

F. W. SCHNEIDER.
ELECTRODE FOR SECONDARY BATTERIES.

No. 580,428. Patented Apr. 13, 1897.

Witnesses
A. L. Beil
Otto Munk

Inventor
Friedrich Wilhelm Schneider
by Richards
Attorneys (No Model.) 2 Sheets—Sheet 2.

F. W. SCHNEIDER.
ELECTRODE FOR SECONDARY BATTERIES.

No. 580,428. Patented Apr. 13, 1897.

Witnesses.
H L Beil
Otto Munk

Inventor:
Friedrich Wilhelm Schneider
by Richards
Attorneys

UNITED STATES PATENT OFFICE.

FRIEDRICH WILHELM SCHNEIDER, OF TRIBERG, GERMANY, ASSIGNOR TO THE ELECTRICITÄTS-GESELLSCHAFT TRIBERG, GESELLSCHAFT MIT BESCHRÄNKTER HAFTUNG, OF SAME PLACE.

ELECTRODE FOR SECONDARY BATTERIES.

SPECIFICATION forming part of Letters Patent No. 580,428, dated April 13, 1897.

Application filed August 15, 1896. Serial No. 602,923. (No model.)

*To all whom it may concern:*

Be it known that I, FRIEDRICH WILHELM SCHNEIDER, engineer, a subject of the Grand Duke of Baden, residing at Triberg, in the Grand Duchy of Baden, in the German Empire, have invented certain new and useful Improvements in Electrodes for Secondary Batteries, of which the following is a specification.

The present invention relates to electrodes in which the active material is prevented from falling out or being washed out of its carrier; and a further object is to use material made as porous as desired, so that any desired current can be conducted to the material and the gases which form in the battery can escape freely.

Figure 1:
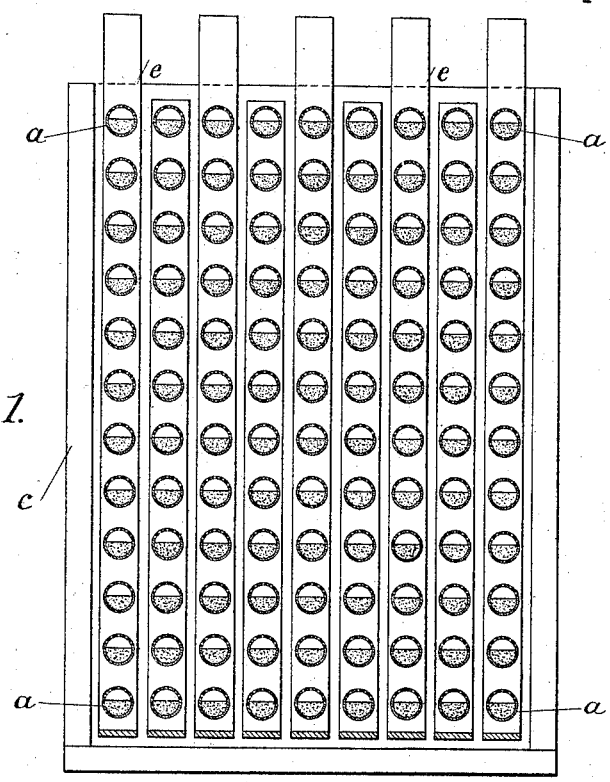
Figure 2:
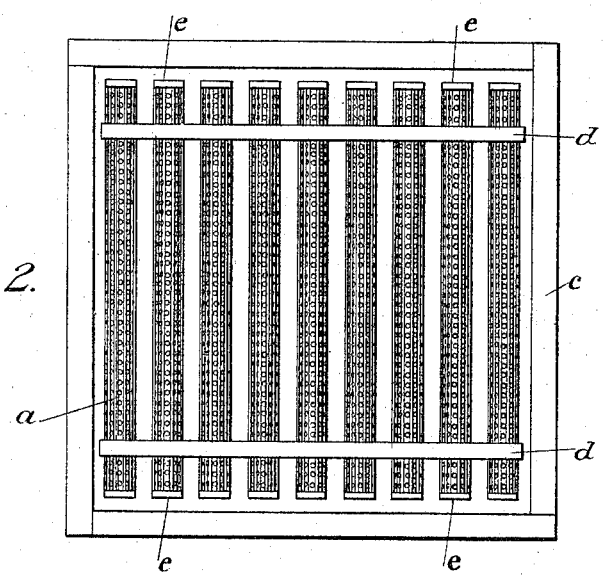
Figure 3:
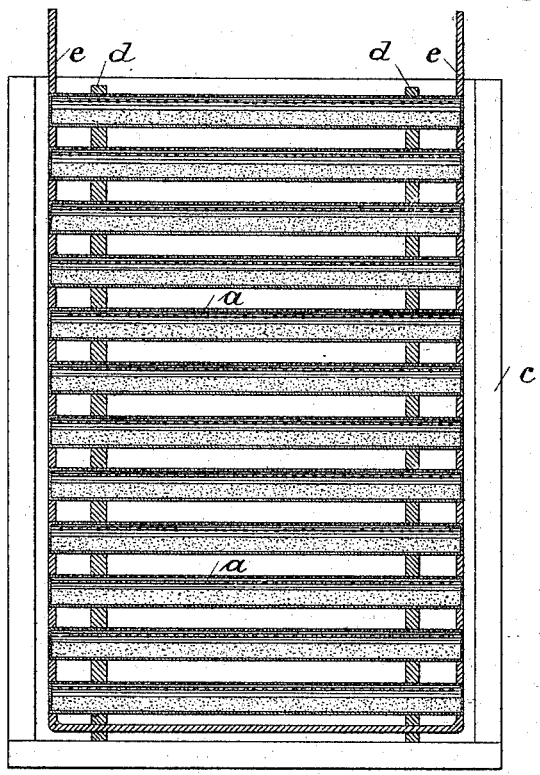
Figure 4:
Figure 5:
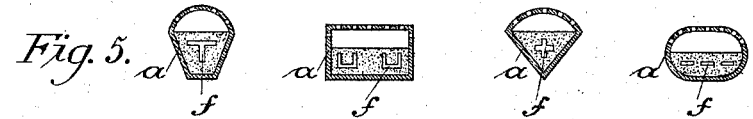
Figure 6:
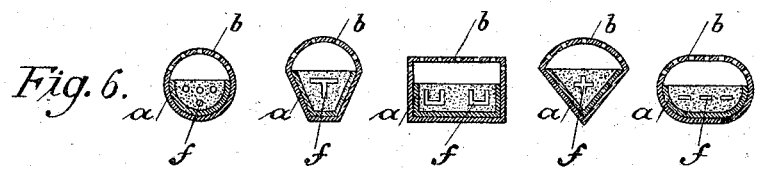

Figures 1 and 3 show two vertical sections of a battery built according to the present invention. Fig. 2 shows a top view of the same. Fig. 4 shows two sections of a single tubular electrode of circular shape. Fig. 5 shows several sections of tubular electrodes of different shapes. Fig. 6 shows several sections of tubular electrodes of different shapes surrounded by an insulated casing.

As shown, tubular or conduit-like electrodes of any diagonal section are employed, the active mass being in the lower part thereof, and in the upper part of every tube there remains a free space, allowing the material to expand and enabling the gases which are formed to escape freely. In the tubular electrodes $a$ the upper part is appropriately perforated, so that the electrolyte can reach the active material but the latter cannot be washed out of the electrode $a$.

The electrodes $a$ are either constructed from appropriate metals—for instance, lead—and in this case serve as conductors, or they are made of acid-proof insulated material and are provided with inner fixtures of any shape—for instance, strips of lead, (lead tissue,) which can also be used for the metal electrodes for the purpose of improving the conductors.

The construction of the electrodes $a$ from acid-proof insulating material has the advantage that no gases will form on the outer side of the electrode which would have a disastrous effect on the battery, causing polarization. For this reason the present electrodes can be constructed in such a manner that the tubes or channels $a$, consisting of conducting material, can be surrounded by a reticulated insulated casing $b$, Fig. 6. In this case the upper part of the tubular electrodes can be omitted, thus diminishing the weight.

The above-described electrodes are arranged in a horizontal position and connected to one another so as to form a battery. The electrodes $a$ can be introduced into a vessel $c$, Figs. 1 to 3, in vertical rows or introduced separately in frames $d$ and connected together, as at $e$, so as to form positive and negative groups. The horizontal position of the electrodes has also the advantage that the particles of material at the time together in the different electrodes are always influenced by acids of the same density, as it is well known that the concentration of the acids increases layerwise toward the bottom of the vessel.

Lead oxids or other compositions may be used as the active material.

I claim—

1. In combination in a battery-cell, the supporting-frame, a series of electrodes supported thereby, and consisting of carriers having an imperforate lower part and a perforated upper part, the active material in the lower imperforate part, the inclosing casing and the liquid electrolyte filling the casing and passing through the perforations of the carriers, substantially as described.

2. In combination with a supporting-frame, electrodes supported thereby consisting of carriers having a perforated top and an imperforate bottom and an open-top trough-shaped receptacle within the same supporting the active material, substantially as described.

In testimony whereof I have signed this specification in the presence of two subscribing witnesses.

FRIEDRICH WILHELM SCHNEIDER.

Witnesses:
HENRY HASPER,
W. HAUPT.